United States Patent
Caroli

[15] 3,635,566
[45] Jan. 18, 1972

[54] PIN TABLE
[72] Inventor: Italo Caroli, Westmount, Quebec, Canada
[73] Assignee: DBM Industries Limited
[22] Filed: Dec. 9, 1969
[21] Appl. No.: 883,385

[30] Foreign Application Priority Data
    Mar. 25, 1969 Canada..................................046,695

[52] U.S. Cl...............................356/170, 33/1 L, 356/172, 408/70
[51] Int. Cl. .......................................................G01b 11/26
[58] Field of Search ..............77/64; 356/170, 156, 172, 164, 356/165; 33/125 A, 1 L; 408/70

[56] References Cited

UNITED STATES PATENTS

| | | | |
|---|---|---|---|
| 2,109,849 | 3/1938 | Price | 356/172 |
| 2,412,017 | 12/1946 | Taylor et al. | 356/170 |
| 2,368,432 | 1/1945 | Turretfini | 356/170 |
| 3,036,493 | 5/1962 | Mottu et al. | 356/164 |
| 3,376,764 | 4/1968 | Schardt | 77/64 |

Primary Examiner—Ronald L. Wibert
Assistant Examiner—J. Rothenberg
Attorney—Cushman, Darby & Cushman

[57] ABSTRACT

Positioning apparatus for use with a machine tool such as a drill press or the like. The positioning apparatus comprises a body frame having a viewing window therein; means for enabling the pin table apparatus to be moved so that the workpiece can be placed at said selected location; and a sighting mechanism for locating the predetermined template position. The sighting mechanism includes a pair of reflective surfaces that are spaced apart and are supported by the body frame, one of the reflective surfaces being visible through the viewing window, with the other reflective surface being optically aligned therewith and being movably supported within the body frame. These reflective surfaces facilitate locating a predetermined template position for positioning the pin table apparatus and workpiece at the location corresponding thereto.

10 Claims, 4 Drawing Figures

PIN TABLE

This invention relates to positioning apparatus in the broad sense, and more especially to positioning apparatus adapted for use with machine tools such as drill presses, milling machines and the like.

The positioning apparatus is adapted to support a workpiece and is usually mounted on a worktable of the machine tool in question. Whenever it is desired to effect certain machining operations to the workpiece, an operator mounts the same onto the positioning apparatus, together with an apertured working template that is of a predetermined form or shape. The position of the apertures in the working template would be used to define the location at which a particular machining operation will be carried out on the workpiece. Since the ways in which a working template is commonly used are well known in the art, it is believed to be unnecessary to describe these ways in greater detail at this time.

It will be recognized that various types of positioning apparatus are known in the art, however, these frequently have some deficiency which detracts from the overall efficient operation of the apparatus. In Canadian Pat. No. 722,929 (Schardt) issued Dec. 7, 1965, there is described a positioning apparatus which features the use of compressed air or gas to provide a relatively friction-free bearing surface or cushion on which the apparatus rides whenever the operator wishes to move the same to place the workpiece at a selected one or other of the locations where some machining operation is to be done to the workpiece. This patent also describes the use of a vacuum to effectively hold or lock the positioning apparatus in the selected location.

Another type of position apparatus, or "pin table" as such apparatus is sometimes called, is illustrated in Canadian Pat. No. 575,892 (Meyer) issued May 12, 1959. That patent describes the use of preformed strips that coact with feeler means to actuate a rather cumbersome drive mechanism. This drive mechanism effects final positioning of the workpiece to the selected location.

In either of the types of positioning apparatus noted above, there is extra equipment required, and such equipment tends to add to the potential sources of mechanical or electrical failure. Moreover, such prior art apparatus also tends to be somewhat restricted in use, in that it is more or less tied down to operation in one location because of the accessory equipment associated with it.

It is an object of the present invention to provide an improved positioning apparatus which is easy to operate, permitting the operator to visually locate a predetermined position on a working template. Thus, the operator does not have to rely only upon a sense of feel, or to move the apparatus about blindly in attempting to locate the desired template position.

It is another object of the present invention to provide an improved positioning apparatus of relatively few component parts, thus increasing the reliability thereof and making the positioning apparatus relatively easy to manufacture.

These and other objects and features may be obtained according to a broad form of the present invention, wherein there is provided positioning apparatus for use with a machine tool such as a drill press or the like, and being adapted to enable placing a workpiece supported thereon at a selected location corresponding to a predetermined position on a working template also supported by the positioning apparatus, such that the workpiece can be machined as required at said selected location, the positioning apparatus comprising; a body frame having a viewing window therein; means for enabling the positioning apparatus to be moved so that the workpiece can be placed at said selected location; and a sighting mechanism for locating the predetermined template position, including a pair of reflective surfaces that are spaced apart and are supported by the body frame, one of the reflective surfaces being visible through the viewing window, with the other reflective surface being optically aligned therewith and being movably supported within the body frame to enable locating the predetermined template position for positioning the apparatus and workpiece at the location corresponding to said predetermined template position.

In a more preferred form the present invention provides pin table positioning apparatus for use with a machine tool such as a drill press or milling machine, for example, and being adapted to enable placing a workpiece supported thereon at a selected location corresponding to a predetermined position on a working template also supported by the pin table positioning apparatus, such that the workpiece can be machined as required at said selected location, the pin table positioning apparatus, comprising; a body frame supported on a worktable provided on the machine tool and having a viewing window therein; a lifting mechanism for lifting and lowering the body frame from and to engagement with the worktable to enable moving the pin table positioning apparatus for placing the workpiece at said selected location; and a sighting mechanism for locating the predetermined template position, including a pair of reflective surfaces that are spaced apart and are supported by the body frame, one of the reflective surfaces being visible through the viewing window, with the other reflective surface being optically aligned therewith and being movably supported within the body frame to enable an operator to visually locate the predetermined template position and subsequently position the pin table positioning apparatus and the workpiece at the selected location corresponding to said predetermined template position.

One specific embodiment of the present invention will now be described below, by way of example only, with reference being made to the accompanying illustrative drawings, in which.

Figure 3:
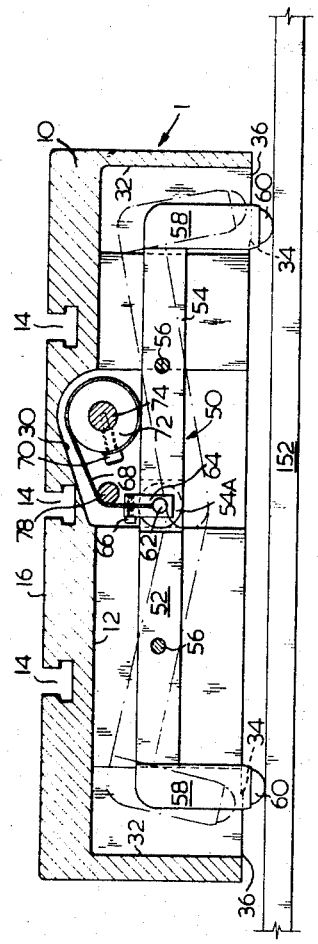
FIG. 3 is a side elevation view taken in section along line 3—3 of FIG. 2, and showing the positioning apparatus in a raised position in which it can be moved about on the worktable.
Figure 4:
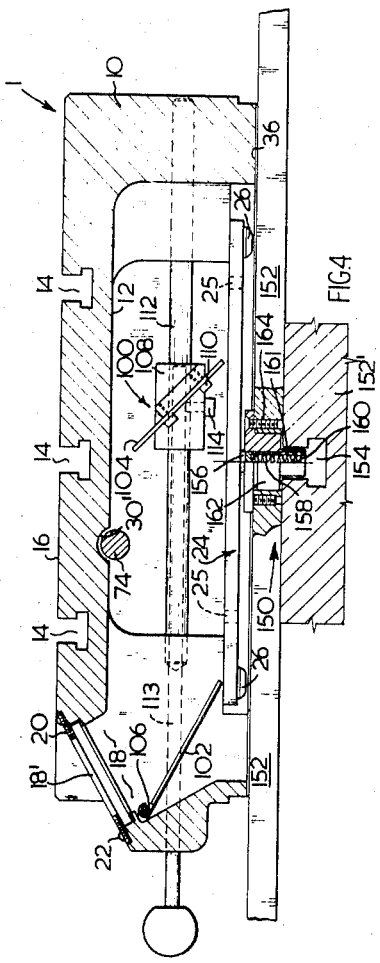
FIG. 4 is a side elevation view taken in section along line 4—4 of FIG. 2, and showing the positioning apparatus in a lowered or operative position wherein machining operations can be carried out on the workpiece being supported on the positioning apparatus.

Turning now to the figures, the numeral 1 designates the pin table positioning apparatus overall. With particular reference to FIGS. 3 and 4, the pin table 1 includes a lifting and lowering mechanism 50, a sighting mechanism 100, and associated with pin table 1 is a locking mechanism 150 mounted in a worktable coverplate 152 that is part of the machine tool (not shown) with which the pin table is being used.

The pin table 1 comprises a body frame 10 having a generally rectangular, dished-out interior cavity 12. A plurality of carefully machined sets of guide channels 14 of generally T-shaped cross section are provided in the upper surface 16 of the body frame 10. The guide channels 14 are generally equally spaced apart and extend parallel to one another. In other words, these sets of guide channels 14 are mutually parallel to one another. It is well known in the art that such sets of guide channels function to enable a workpiece to be adjustably secured to the pin table 1.

Figure 2:
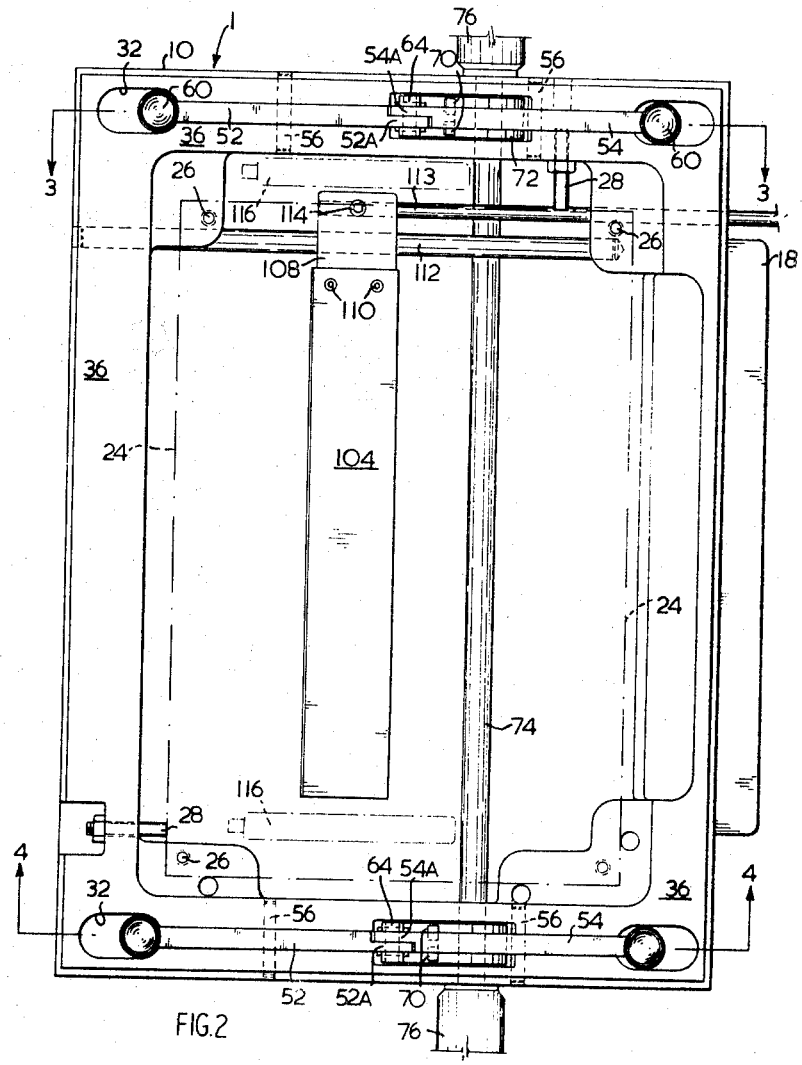
FIG. 2 is a bottom plan view of the positioning apparatus of FIG. 1, and shows the positioning apparatus from the bottom thereof.

The body frame 10 is also formed with a viewing window 18 having a supporting frame 20 which is fastened by means of screws 22 or the like to the body frame 10. A window 18' of glass, or transparent plastic or the like is mounted in the supporting frame 20. In accordance with the present invention, an operator can look through the viewing window 18 and by means of a pair of reflective surfaces 102 and 104 of highly polished metal, mirrors or the like can visually locate a predetermined position on a template 24. The template 24 is attached to the body frame 10 as shown in FIGS. 2 and 4 by means of fastening screws 26, or the like. A pair of adjustable alignment screws 28 are also attached to the body frame 10 in order to enable the operator to mount the template 24 in a predetermined orientation relative to the pin table 1, and in particular, relative to the guide channels 14.

As previously described, the body frame 10 is formed with an interior cavity 12, with the peripheral wall portions thus provided on the body frame forming a seating or table-engaging surface 36. This seating surface 36 is delimited interiorly thereof by a shoulder 34 with the pin table 1 thus being effectively limited to engagement with the work table 152 along the peripheral wall portions thereof. It is to be noted from FIGS. 2 and 3, that the wall portions and the seating surface 36 are provided near the corners of the pin table 1 with slightly elongated bore holes 32 which receive leg portions 58 of the lifting and lowering mechanism 50. It is also to be noted from FIG. 3 that the top inner surface of the body frame 10 is further recessed at 30 and 30' (FIG. 4) to accommodate other parts of the lifting and lowering mechanism 50.

As may be seen in FIG. 2, the lifting and lowering mechanism 50 comprises two identical assemblies mounted on opposite sides of the body frame 10. These identical assemblies are operatively interconnected and simultaneously actuated by means of a shaft 74 which is common to both assemblies and which is provided at both ends thereof with actuating handles 76. Although the following description is with reference specifically to only one of these two assemblies, it is to be understood that the same description applies to the other, equally well. FIG. 3 shows one assembly of the lifting and lowering mechanism as comprising main supporting members 52 and 54, each being pivotally mounted on the body frame 10 by means of main pivot pins 56. These two main supporting members 52 and 54 include tongue portions 52A and 54A which overlap one another. A leg section 58 is integrally and substantially perpendicularly connected to each of the main supporting members 52 and 54. To facilitate moving the pin table 1 easily, a foot portion 60 integral with the leg sections 58, is provided with a ball roller, a castor or the like. By means of such a foot portion 60, the pin table 1 can be rolled along over the surface of the coverplate 152 of the worktable 152' with comparatively little effort.

It will be seen from the drawings that the overlapping tongue portions 52A and 54A have a semicircular periphery and are joined together by a common pivot pin 62. The pivot pin 62 enables relative rotational movement to occur between the main supporting members 52 and 54. The pivot pin 62 is rotatably mounted in a connecting block 64 and extends through slots (not shown) in the tongue portions 52A and 54A. It will be evident from the manner in which the main supporting members 52 and 54 pivot in opposite directions, that the slot in tongue portions 52A and 54A will be somewhat larger than the diameter of pivot pin 62. The connecting block 64 serves to anchor one end of a tension cable or strip 68 that is connected thereto by fastening screws 66 or the like. This tension cable or strip 68 is preferably made of steel or other material having considerable strength, and is connected at its other end by screws 70 to a winching drum 72. This winching drum 72 is carried on the shaft 74, and as previously mentioned, this shaft extends exteriorly of the body frame 10 on opposite sides, and is provided with actuating handles 76. In order that the tension cable or strip 68 exerts a lifting force to the overlapped tongue portions of the supporting members 52 and 54 in a substantially vertical direction (relative to the work table 152), an idler pin 78 is mounted in the body frame 10.

FIG. 3 indicates that the weight of the pin table 1 and workpiece thereon is transferred through main pivot pins 56 to the lifting and lowering mechanism 50 and hence through foot portions 60 to the coverplate 152. Moreover, it will also be evident that because there is no counter force to the moment developed by the weight of the pin table 1 acting through foot portions 60 and hence about the axis of main pivot pins 56, that the normal "rest" position of the pin table is down, and in contact with the coverplate 152. Similarly, the normal "rest" position for the lifting and lowering mechanism 50 is that shown in dotted lines in FIG. 3. When it is desired to move the pin table 1, the operator merely grasps the actuating handles 76 and turns the same, thus causing a lifting force to be applied to the tongue portions of the main supporting members 52 and 54 of the lifting/lowering mechanism 50 hence causing the same to be pivoted counterclockwise and clockwise respectively, as seen in FIG. 3. The pin table 1 and workpiece carried thereon are then moved to the next selected location at which a certain machining operation is to be performed on the workpiece.

Figure 1:
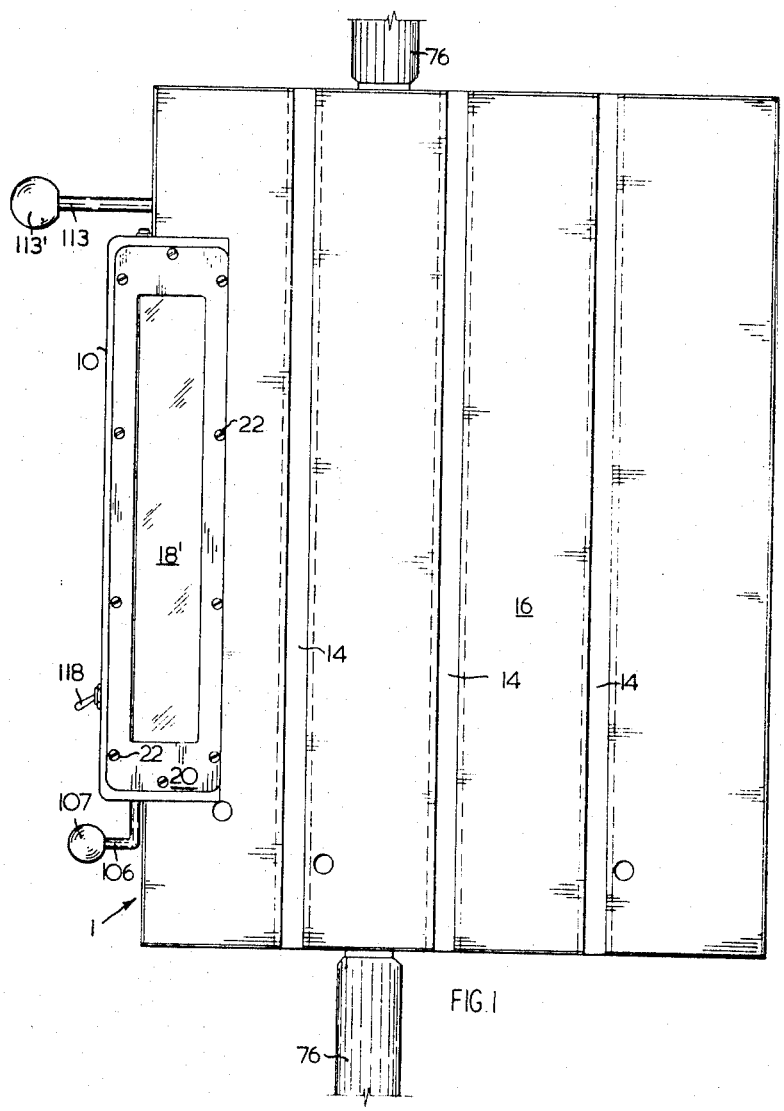
FIG. 1 is a top plan view of one embodiment of a positioning apparatus according to the present invention.

As previously indicated, when an operator wishes to position or reposition the pin table 1, he can look through the viewing window 18, and via the reflective surfaces 102 and 104 look down onto the template 24. As may be seen particularly in FIG. 4, the reflective surface 102 is fixedly attached to a supporting shaft 106 which is pivotally mounted in the body frame 10. One end of the supporting shaft 106 extends to the exterior of the body frame 10 and is provided with an actuating handle 107, as may be seen in FIG. 1. Manipulation of the actuating handle 107 by the operator will effect pivotal adjustment of the reflective surface 102 in order to accommodate different lines of sight from the operator through the viewing window 18 and onto the reflective surface 102. The reflective surface 104 is fixedly mounted against rotational motion thereof in order that a line of sight from the reflective surface 102 will always be reflected from the surface 104 directly downwards onto the template 24. The reflective surface 104 is, however, horizontally adjustable in order to enable the operator to move the same and pass over and scan the template 24. The reflective surface 104 is fixedly attached to a supporting block 108 by means of fastening screws 110 or the like. The supporting block 108 is provided with two bore holes extending therethrough, with one of such bore holes being adapted to receive a supporting shaft 112 while the other bore hole is adapted to receive one end of an actuating rod 113 that extends exteriorly of the body frame 10 and has a handle 113' thereon. The actuating rod 113 is secured against motion relative to the supporting block 108 by means of a setscrew 114 or the like. In order to permit horizontal adjustment of the reflecting surface 104, the supporting block 108 is slidably mounted on the main supporting shaft 112. Preferably, there will be no rotational movement of the reflective surface 104 relative to the supporting shaft 112, and therefore, such shaft will be square or rectangular in cross section, or it may be provided with a rib or groove, to cooperate with a complementary structure in the bore hole of the supporting block 108, i.e., in a "tongue-in-groove" manner. A second supporting shaft may be provided to support the opposite end of reflective surface 104. The reflective surfaces 102 and 104 are generally of an elongated rectangular shape, and afford the operator the possibility of looking down directly at the surface of the template 24 over a substantial portion of the area of the template. At least one source of illumination in the form, for instance, of a fluorescent light 116 will normally be provided within the interior cavity 12 of the body frame 10, with such a source of illumination being controlled by means of a switch 118 provided exteriorly of the pin table 1.

It is common that a template is usually provided with apertures, bore holes, or other deformations of a similar kind to enable some type of sensing mechanism to detect the same and be responsive thereto. In the present instance, the template 24 is provided with apertures 25, with such apertures being located in the template according to a predetermined plan or layout related to the workpiece in question. The position of these apertures 25 correspond to selected locations on the workpiece being carried by the pin table 1, at which locations certain desired machining operations on the workpiece are to be carried out. Both the workpiece and template are located by a common dowel pin.

The locking mechanism 150 that is specifically illustrated in FIG. 4, is adapted to be received in a guide channel 154 in the work table 152' and coverplate 152. The coverplate 152 serves to enable the pin table 1 to be moved about by preventing the foot portions 60 from falling into the slots, channels or apertures normally found in the work table 152'. The locking mechanism 150 includes a locking pin 156 which is biased by means of a compression spring 158 outwardly, to be received within one of the template apertures 25 when the pin and aperture are brought into alignment. The locking pin 156 is bored from one end thereof, with the compression spring 158 being positioned within this bore hole. A backing pin 160 is positioned within a pair of diametrically opposed slots 161 provided in the sidewalls of the locking pin 156. It will be noted from FIG. 4 that the backing pin 160 is rigidly secured to that portion of a cover piece 162 which extends partly down into the guide channel 154. The cover piece 162 is fastened to the coverplate 152 by means of screws 164 or similar fastening means. It will be apparent from the way in which the locking pin 156 is mounted, that this pin will have reciprocal vertical movement to effect locking engagement of the pin 156 in an aperture 25 of the template 24.

It will therefore be recognized that when it is desired to place the workpiece at a preselected location corresponding to a predetermined position on the template 24, for effecting certain machining operations to the workpiece, the operator will use the sighting mechanism 100 to locate the predetermined position defined by a particular aperture 25. Having located that aperture, he will then operate the lifting and lowering mechanism 50 to a lift the body frame 10 free of the coverplate table 152. The operator will then move the pin table 1 and the workpiece until the locking pin 156 becomes aligned with the particular aperture 25 selected and is received therein to effectively hold or lock the pin table 1 at the selected location. It will be recognized, of course, that the workpiece will have initially been positioned on the body frame 10 by means of the common dowel pin to be compatible with the orientation of the template 24. In this way, as soon as the template 24, is brought into position and locked there, by means of the mechanism 150, the workpiece will similarly have been placed into the correct location to enable the desired machining operation to be carried out on that particular portion of the workpiece. It will also be apparent that if the template 24 were manufactured from a transparent or at least semitransparent plastic or similar material, the operator could locate the predetermined template position defined by a particular aperture 25 and move the pin table 1 to position the workpiece to a location corresponding exactly thereto, with a minimum of groping about. This is in contrast to some known devices in which very little or no indication is visually obtainable of where the predetermined template position is relative to the locking pin 156. It is to be recognized that if the template is of a transparent plastic and highly accurate positioning is required in an operation carried out a very large number of times, some wear problems may arise. It is likely that for purely strength and durability reasons, steel templates will be used where high accuracy is critical. This situation will be apparent to those familiar with this art. It will therefore be seen that the present invention provides a pin table positioning apparatus which is relatively simple and easy to operate, while simultaneously enabling the operator to see almost all of the reference points being used to bring the pin table and workpiece to any selected location.

The foregoing disclosure has described but one specific embodiment of the present invention, and has indicated some of the modifications which may be made without departing from the spirit of the invention. Additional modifications may also be possible and it is comprehended that all such modifications and alternatives may be used in a positioning apparatus of the type contemplated herein without departing from the spirit of the invention defined in the appended claims.

The embodiments of the invention in which an exclusive property or privilege is claimed are defined as follows:

1. Positioning apparatus for use with a machine tool such as a drill press, a milling machine, or the like, to enable placing a selected portion of a workpiece supported thereon above a selected marked location on a worktable such that the portion of said workpiece can be machined as required at said selected location, the positioning apparatus comprising:
 a body frame having a viewing window therein, said body frame supporting a workpiece to be machined;
 an apertured template mounted within said frame in fixed predetermined relationship with respect to said workpiece;
 a sighting mechanism for locating a selected template aperture which is in said predetermined relationship to said selected workpiece portion including a pair of reflective surfaces that are spaced apart and are supported by the body frame, one of the reflective surfaces being visible through the viewing window, with the other reflective surface being optically aligned therewith and being movably supported within the body frame to enable viewing the selected template aperture, and means for moving said body frame to a position such that the selected template aperture overlies said marked location on said worktable when viewed through said sighting mechanism, whereby said selected portion of said workpiece is positioned to be machined.

2. The positioning apparatus of claim 1, wherein the other reflective surface is movably mounted on supporting guide means, and has actuating means connected thereto for enabling an operator to move said other reflective surface over the template, thereby to visibly locate the selected template aperture.

3. The positioning apparatus of claim 1, wherein the means for moving the body frame includes a lifting and lowering mechanism operable for effecting disengagement of a major portion of the body frame from the worktable on which it is mounted.

4. The positioning apparatus of claim 3, wherein the worktable is provided with a locking mechanism having pin means therein, the pin means being operative for engaging the selected template aperture to effect holding the workpiece substantially fixed in place.

5. Positioning apparatus for use with a machine tool such as a drill press or milling machine, for example to enable placing a selected portion of a workpiece supported thereon above a selected marked located on a worktable, such that the portion of said workpiece can be machined as required at said selected location, the position apparatus comprising:
 a body frame supported on the worktable provided on the machine tool, the body frame having a viewing window therein, said body frame supporting a workpiece to be machined;
 an apertured template mounted within said frame in fixed predetermined relationship with respect to said workpiece;
 a lifting mechanism for lifting and lowering the body frame from and to engagement with the worktable to enable moving the positioning apparatus for placing the workpiece at said selected location; and
 a sighting mechanism for locating a selected template aperture which is in said predetermined relationship to said selected workpiece portion, including a pair of reflective surfaces that are spaced apart and are supported by the body frame, one of the reflective surfaces being visible through the viewing window, with the other reflective surface being optically aligned therewith and being movably supported within the body frame to enable viewing the selected template aperture and means for moving said body frame to a position such that the selected template aperture overlies said selected marked location on the worktable when viewed through said sighting mechanism, whereby said selected portion of the workpiece is positioned to be machined.

6. The positioning apparatus of claim 5, wherein the other reflective surface is slidably mounted on supporting guide means, and has actuating means operatively connected thereto such that an operator may move said other reflective surface over the apertured template and thereby visually locate the selected template aperture.

7. The positioning apparatus of claim 6, wherein the one reflective surface is pivotally supported by the body frame to enable angular adjustment of the line of sight from the operator to said one reflective surface.

8. The positioning apparatus of claim 7, wherein said reflective surfaces are mirrors.

9. The positioning apparatus of claim 5, wherein the lifting mechanism includes a winching assembly and supporting frame means which are operable to engage the worktable for permitting relative movement between said worktable and positioning apparatus, the supporting frame means being pivotally connected to the body frame to enable said winching assembly to lift the body frame from the worktable to facilitate moving the positioning apparatus and workpiece to said selected marked location.

10. The positioning apparatus of claim 9, wherein the supporting frame means is normally biased to a position disposed substantially wholly within the body frame such that said body frame is in engagement with the worktable.

* * * * *